US012581174B2

(12) United States Patent (10) Patent No.: US 12,581,174 B2

Kim et al. (45) Date of Patent: ***Mar. 17, 2026

(54) ELECTRONIC DEVICE INCLUDING CAMERA MODULE

(71) Applicant: Samsung Electronics Co., Ltd.,
Suwon-si (KR)

(72) Inventors: Jinwoo Kim, Suwon-si (KR); Sujin Jung, Suwon-si (KR); Seungkwon Choi, Suwon-si (KR); Kyoungjong Kim, Suwon-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/742,429

(22) Filed: Jun. 13, 2024

(65) Prior Publication Data

US 2024/0334031 A1 Oct. 3, 2024

Related U.S. Application Data

(63) Continuation of application No. 17/534,958, filed on Nov. 24, 2021, now Pat. No. 12,028,590, which is a
(Continued)

(30) Foreign Application Priority Data

Dec. 4, 2020 (KR) ........................ 10-2020-0168765

(51) Int. Cl.
*H04N 23/51* (2023.01)
*H04M 1/02* (2006.01)
(Continued)

(52) U.S. Cl.
CPC ............. *H04N 23/51* (2023.01); *H04N 23/55* (2023.01); *H04N 23/57* (2023.01)

(58) Field of Classification Search
CPC ........ H04N 23/51; H04N 23/55; H04N 23/57; H04N 23/52; H04M 1/0283; H04M 1/0264
See application file for complete search history.

(56) References Cited

U.S. PATENT DOCUMENTS 5,028,943 A 7/1991 Ishii et al.
2014/0022450 A1 1/2014 Chang et al.
(Continued)

FOREIGN PATENT DOCUMENTS

CN 107547787 A 1/2018
CN 207541546 U 6/2018
(Continued)

OTHER PUBLICATIONS

International Search Report dated Mar. 2, 2022, issued in International Application No. PCT/KR2021/016926.
(Continued)

*Primary Examiner* — Ahmed A Berhan
(74) *Attorney, Agent, or Firm* — Jefferson IP Law, LLP

(57) ABSTRACT

An electronic device is provided. The electronic device includes a housing including a support member and a rear plate, a camera support member disposed between the support member and the rear plate, a camera module disposed on the support member, a camera window covering at least a part of the camera module, and a compression member disposed between the camera window and the camera module. The camera module may include a first area facing the camera support member, a second area facing the compression member, and a third area facing the camera window and at least partially surrounded by the compression member.

20 Claims, 11 Drawing Sheets

Related U.S. Application Data continuation of application No. PCT/KR2021/016926, filed on Nov. 17, 2021.

(51) Int. Cl.
  *H04N 23/55*       (2023.01)
  *H04N 23/57*       (2023.01)

(56)                References Cited

U.S. PATENT DOCUMENTS

| | | |
|---|---|---|
| 2014/0253799 A1 | 9/2014 | Moon et al. |
| 2015/0256018 A1 | 9/2015 | Wei et al. |
| 2016/0065801 A1 | 3/2016 | Bae et al. |
| 2019/0141172 A1 | 5/2019 | Chen |
| 2019/0141220 A1 | 5/2019 | Chen et al. |
| 2020/0177771 A1 | 6/2020 | Noh et al. |
| 2020/0310489 A1* | 10/2020 | Spraggs ................. H04N 23/45 |

FOREIGN PATENT DOCUMENTS

| | | |
|---|---|---|
| KR | 10-2014-0111503 A | 9/2014 |
| KR | 10-2015-0106209 A | 9/2015 |
| KR | 10-2020-0066922 A | 6/2020 |
| KR | 10-2020-0101240 A | 8/2020 |
| KR | 10-2020-0115090 A | 10/2020 |

OTHER PUBLICATIONS

Korean Office Action dated Feb. 21, 2025, issued in Korean Application No. 10-2020-0168765.

* cited by examiner

ELECTRONIC DEVICE INCLUDING CAMERA MODULE

CROSS-REFERENCE TO RELATED APPLICATION(S)

This application is a continuation application of prior application Ser. No. 17/534,958, filed on Nov. 24, 2021, which is a continuation application, claiming priority under § 365 (c), of an International application No. PCT/KR2021/016926, filed on Nov. 17, 2021, which is based on and claims the benefit of a Korean patent application number 10-2020-0168765, filed on Dec. 4, 2020, in the Korean Intellectual Property Office, the disclosure of which is incorporated by reference herein in its entirety.

TECHNICAL FIELD

The disclosure relates to an electronic device including a camera module.

BACKGROUND ART

Due to the development of information and communication technology and semiconductor technology, various functions are being integrated into one portable electronic device. For example, the electronic device may implement entertainment functions such as games, multimedia functions such as music/video playback, communication and security functions for mobile banking, camera functions for capturing images/videos, schedule management, and an electronic wallet function as well as communication functions. Such electronic devices are being miniaturized so that users may conveniently carry them.

The above information is presented as background information only to assist with an understanding of the disclosure. No determination has been made, and no assertion is made, as to whether any of the above might be applicable as prior art with regard to the disclosure.

DISCLOSURE

Technical Problem

An electronic device (e.g., a portable terminal) may include a camera for capturing an image and/or a video. The camera may be fixed at a designated position to capture a subject within a designated range. However, to protect the lens of the camera, a lens protection film is disposed on the front of the camera in a manufacturing process of the electronic device, and the camera may be moved away from the designated position due to an external force applied during removal of the lens protection film or the repulsive force of a flexible printed circuit board coupled to the camera.

To fix the camera to the electronic device, a camera bracket and/or an adhesive may be used. However, when a camera bracket and/or an adhesive is used, manufacturing cost and/or time may increase due to the material cost of the camera bracket and/or the adhesive, and an additional bonding process and calibration process of the camera.

Aspects of the disclosure are to address at least the above-mentioned problems and/or disadvantages and to provide at least the advantages described below. Accordingly, an aspect of the disclosure is to provide an electronic device in which a camera may be fixed to a housing by using a camera support member may be provided.

However, the problems to be solved in the disclosure are not limited to the above-mentioned problems, and may be variously extended without departing from the spirit and scope of the disclosure.

Additional aspects will be set forth in part in the description which follows and, in part, will be apparent from the description, or may be learned by practice of the presented embodiments.

Technical Solution

In accordance with an aspect of the disclosure, an electronic device is provided. The an electronic device includes a housing including a support member and a rear plate, a camera support member disposed between the support member and the rear plate, a camera module disposed on the support member, a camera window covering at least a part of the camera module, and a compression member disposed between the camera window and the camera module, and the camera module may include a first area facing the camera support member, a second area facing the compression member, and a third area facing the camera window and at least partially surrounded by the compression member.

In accordance with another aspect of the disclosure, an electronic device is provided. The electronic device includes a housing including a support member and a rear plate, a camera module disposed on the support member, a camera support member disposed between the support member and the rear plate, a camera window covering at least a part of the camera module, and a compression member disposed between the camera window and the camera module, and the camera module may include a camera housing accommodating an image sensor and including a first area facing the camera support member, and a second area protruding from the first area toward the camera window and facing the compression member, and a lens barrel accommodating at least one lens and including a third area facing the camera window.

Advantageous Effects

In an electronic device according to various embodiments of the disclosure, use of a camera support member may prevent a camera from being detached in a manufacturing process of the electronic device. Since the detachment of the camera is prevented, the vignetting phenomenon of an image obtained from the electronic device may be reduced, and a calibration process may not be required for the camera.

According to various embodiments of the disclosure, because a bracket for fixing the camera may not be required, and the amount of adhesive used for fixing the camera may be reduced, the manufacturing cost of the electronic device may be reduced.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
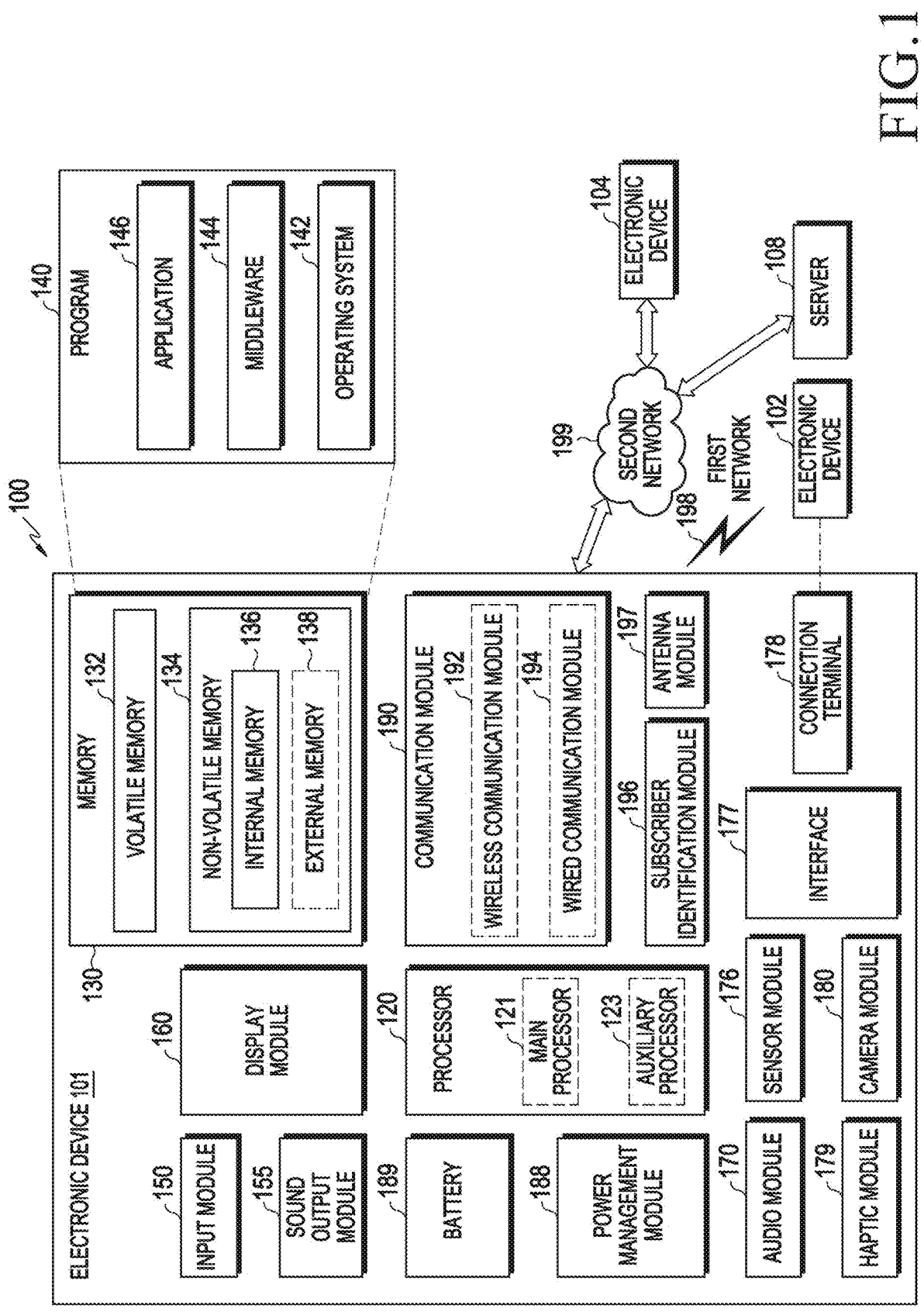
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 134 and external memory 136.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
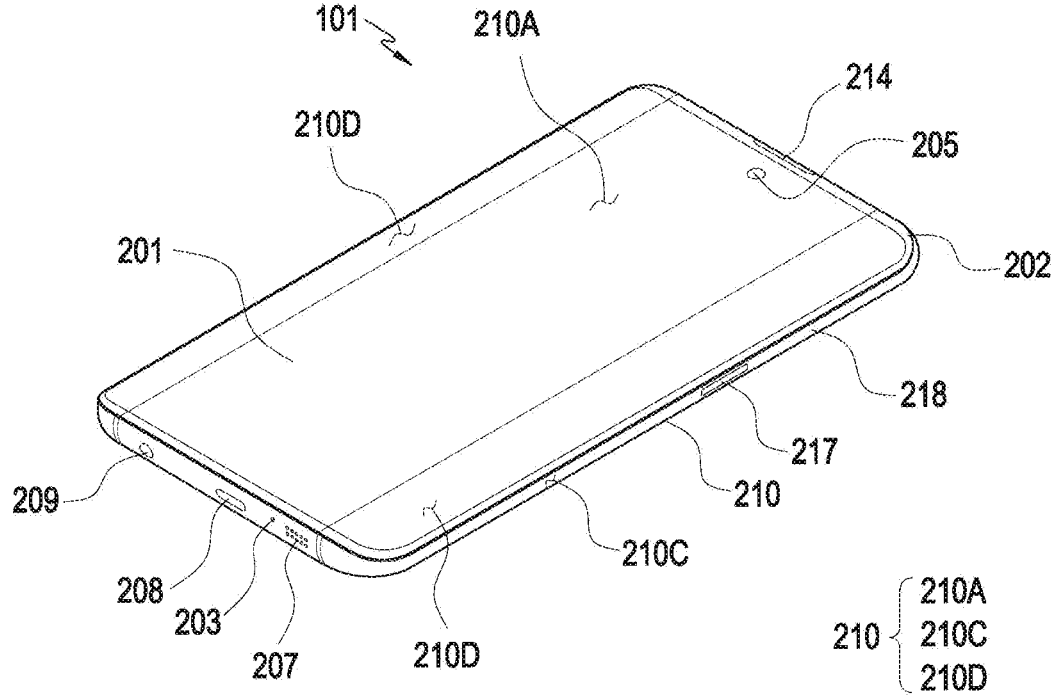
FIG. 2 is a perspective view illustrating the front surface of an electronic device according to an embodiment of the disclosure.
Figure 3:
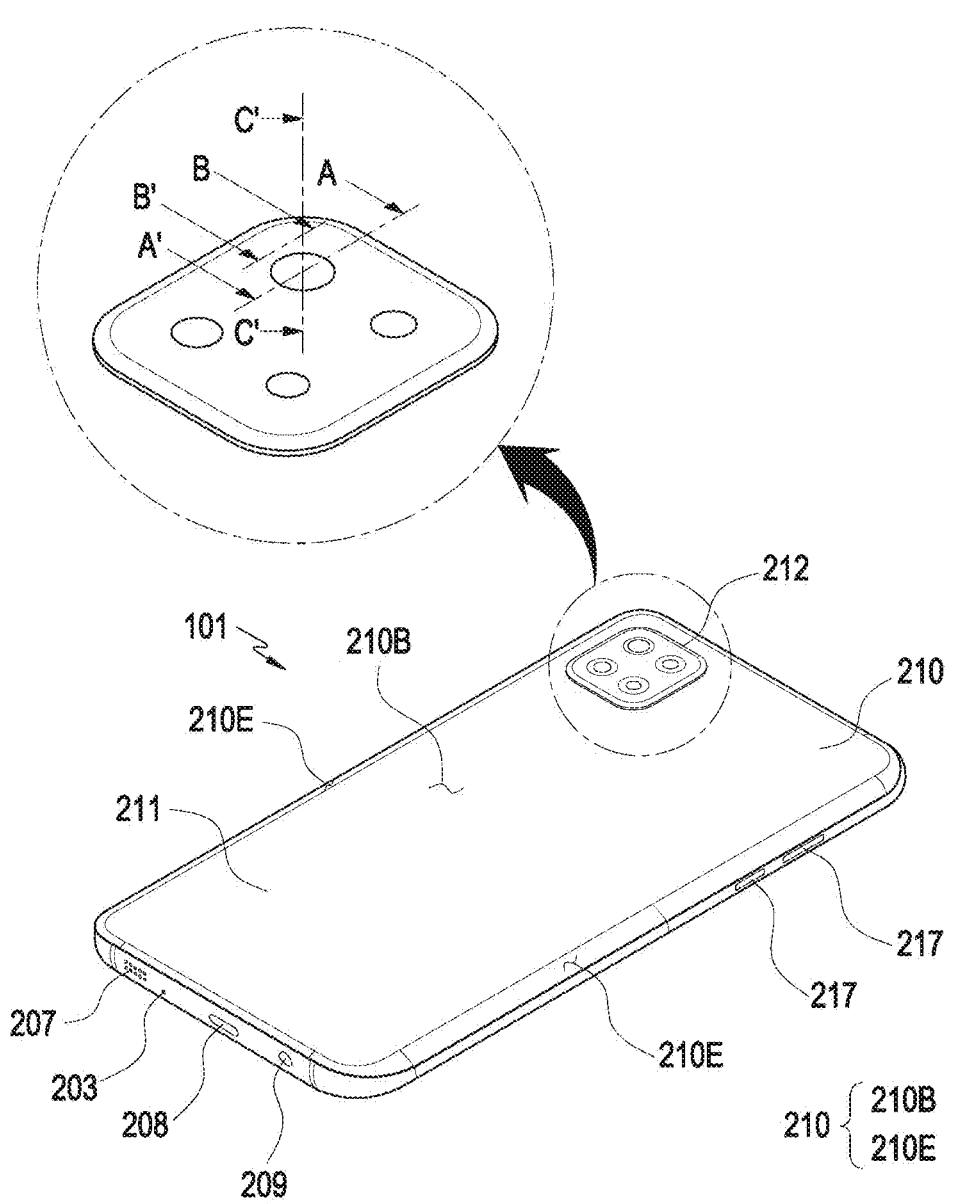
FIG. 3 is a perspective view illustrating the rear surface of an electronic device according to an embodiment of the disclosure.

FIG. 2 is a perspective view illustrating the front surface of an electronic device according to an embodiment of the disclosure. FIG. 3 is a perspective view illustrating the rear surface of an electronic device according to an embodiment of the disclosure.

Referring to FIGS. 2 and 3, the electronic device 101 may include a housing 210 which includes a front surface 210A, a rear surface 210B, and a side surface 210C surrounding a space between the front surface 210A and the rear surface 210B. In another embodiment (not shown), the housing 210 may refer to a structure that forms a part of the front surface 210A of FIG. 2, the rear surface 210B of FIG. 3, and the side surface 210C. At least a part of the front surface 210A may be formed by a substantially transparent front plate 202 (e.g., a glass plate or polymer plate including various coating layers). The rear surface 210B may be formed by a rear plate 211. The rear plate 211 may be formed of glass, ceramic, polymer, metal (e.g., aluminum, stainless steel (STS), or magnesium), or a combination of at least two of these materials. The side surface 210C may be coupled with the front plate 202 and the rear plate 211 and formed by a side bezel structure (or "side member") 218 including metal and/or polymer. In some embodiments, the rear plate 211 and the side bezel structure 218 may be integrally formed and include the same material (e.g., glass, a metallic material such as aluminum, or ceramic).

In the illustrated embodiment, the front plate 202 may include two first edge areas 210D extending seamlessly from the front surface 210A toward the rear plate 211 at ends of both long edges thereof. As shown in FIG. 3, the rear plate 211 may include two second edge areas 210E extending seamlessly from the rear surface 210B toward the front plate 202 at ends of both long edges thereof. In some embodiments, the front plate 202 (or the rear plate 211) may include only one of the first edge areas 210D (or only one of the second edge areas 210E). In other embodiments, at least two of the first edge areas 210D or the second edge areas 210E may be omitted. When viewed from a side of the electronic device 101, the side bezel structure 218 may have a first thickness (or width) on the side surfaces which do not include the first edge areas 210D or the second edge areas 210E, and a second thickness smaller than the first thickness on the side surfaces which include the first edge areas 210D or the second edge areas 210E.

The electronic device 101 may include at least one of a display 201, audio modules 203, 207, and 214 (e.g., the audio module 170 of FIG. 1), a sensor module (e.g., the sensor module 176 of FIG. 1), camera modules 205 and 212 (e.g., the camera module 180 of FIG. 1), key input devices 217 (e.g., the input module 150 of FIG. 1), or connector holes 208 and 209 (e.g., the connecting terminal 178 of FIG. 1). In some embodiments, the electronic device 101 may not be provided with at least one (e.g., the connector hole 209) of the components or additionally include other components.

The display 201 may be visually exposed, for example, through a substantial portion of the front plate 202. At least a part of the display 201 may be exposed through the front plate 202 forming the front surface 210a and the first edge areas 210D. The corners of the display 201 may be formed in the same shapes as those of adjacent peripheral portions of the front plate 202 on the whole. In another embodiment (not shown), the gap between the periphery of the display 201 and the periphery of the front plate 202 may be equal on the whole to increase the exposed area of the display 201.

A surface (or the front plate 202) of the housing 210 may include a view area formed by visual exposure of the display 201. For example, the view area may include the front surface 210A and the first edge areas 210D.

In another embodiment (not shown), the electronic device 200 may include a recess or an opening formed in a part of the view area (e.g., the front surface 210A and the first edge areas 210D) of the display 201, and may include at least one of the audio module 214, a sensor module (not shown), a light emitting element (not shown), or the camera module 205, which is aligned with the recess or the opening. In another embodiment (not shown), the electronic device 101 may include at least one of the audio module 214, a sensor module (not shown), the camera module, a fingerprint sensor (not shown), or a light emitting element (not shown) on the rear surface of the view area of the display 201.

In another embodiment (not shown), the display 201 may be incorporated with or disposed adjacent to a touch sensing circuit, a pressure sensor that measures the intensity (pressure) of a touch, and/or a digitizer that detects a magnetic field-based stylus pen.

At least one of the key input devices 217 may be disposed in the side bezel structure 218.

The audio modules 203, 207, and 214 may include a microphone hole 203 and speaker holes 207 and 214. A microphone for obtaining an external sound may be disposed in the microphone hole 203, and in some embodiments, a plurality of microphones may be disposed to detect the direction of a sound. In some embodiments, the speaker holes 207 and 214 may include an external speaker hole 207 and a receiver hole 214 for calls. The speaker holes 207 and 214 and the microphone hole 203 may be implemented as a single hole, or a speaker (e.g., a piezo speaker) may be included without the speaker holes 207 and 214.

The sensor module (not shown) may generate an electrical signal or data value corresponding to an internal operation state or external environmental state of the electronic device 101. The sensor module (not shown) may include, for example, a first sensor module (not shown) (e.g., a proximity sensor) and/or a second sensor module (not shown) (e.g., a fingerprint sensor), which is disposed on the front surface 210A of the housing 210, and/or a third sensor module (not shown) (e.g., a heart rate monitor (HRM) sensor) and/or a fourth sensor module (not shown) (e.g., a fingerprint sensor), which is disposed on the rear surface 210B of the housing 210. In some embodiments (not shown), the fingerprint sensor may be disposed on the rear surface 210B as well as on the front surface 210A (e.g., the display 201) of the housing 210. The electronic device 101 may further include a sensor module (not shown), such as at least one of a gesture sensor, a gyro sensor, a barometric pressure sensor, a magnetic sensor, an acceleration sensor, a grip sensor, a color sensor, an IR sensor, a biosensor, a temperature sensor, a humidity sensor, or an illuminance sensor (not shown).

The camera modules 205 and 212 may include a front camera module 205 disposed on the front surface 210A of the electronic device 101, and a rear camera modules 212 and/or a flash (not shown) disposed on the rear surface 210B of the electronic device 101. Each of the camera modules 205 and 212 may include one or more lenses, an image sensor, and/or an image signal processor. The flash may include a light emitting diode (LED) or a xenon lamp. Two or more lenses (an IR camera, a wide-angle lens, and a telephoto lens) and image sensors may be arranged on one surface of the electronic device 101.

According to an embodiment of the disclosure, the key input devices 217 may be arranged on the side surface 210C of the housing 210. According to another embodiment of the disclosure, one or more of the above key input devices 217 may be omitted, and the omitted key input devices 217 may be implemented in other forms, such as soft keys on the display 201.

A light emitting element (not shown) may be disposed, for example, on the front surface 210A of the housing 210. The light emitting element (not shown) may provide state information about the electronic device 101 in the form of light. In another embodiment, the light emitting element (not shown) may provide a light source interworking, for example, with an operation of the front camera module 205. The light emitting element (not shown) may include, for example, an LED, an IR LED, and/or a xenon lamp.

The connector holes 208 and 209 may include a connector hole 208 that may accommodate a connector (e.g., a universal serial bus (USB) connector) for transmitting and receiving power and/or a second connector hole 209 (e.g., an earphone jack) that may accommodate a connector for transmitting and receiving an audio signal to and from an external electronic device.

Figure 4:
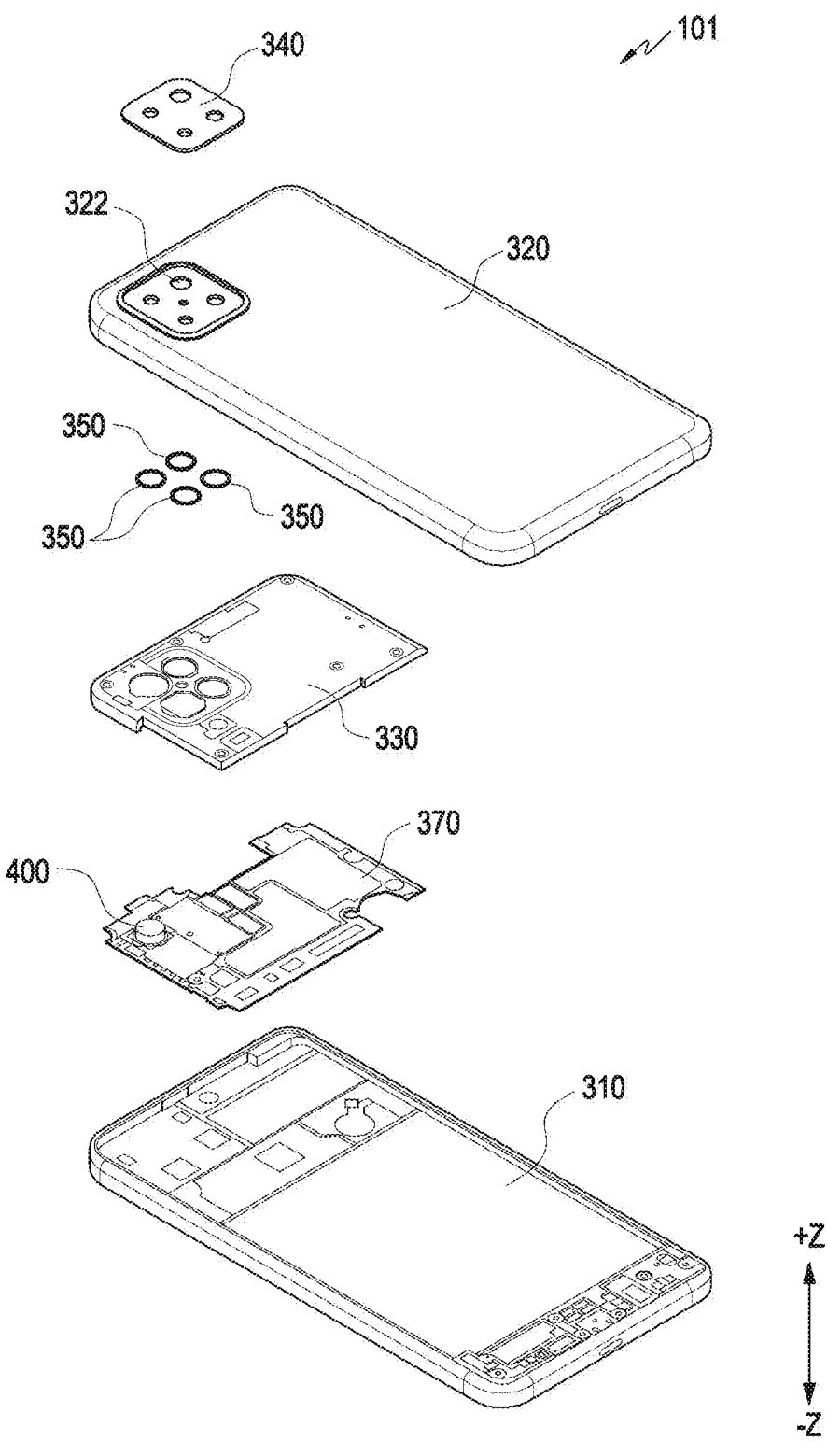
FIG. 4 is an exploded perspective view illustrating an electronic device according to an embodiment of the disclosure.

FIG. 4 is an exploded perspective view illustrating an electronic device according to an embodiment of the disclosure.

Referring to FIG. 4, the electronic device 101 may include a support member 310, a rear plate 320, a camera support member 330, a camera window 340, a compression member 350, a printed circuit board 370, and a camera module 400. The configurations of the electronic device 101, the rear plate 320, and the camera module 400 of FIG. 4 may be wholly or partially identical to those of the electronic device 101, the rear plate 211, and the camera module 212 of FIG. 3.

The support member 310 may support components of the electronic device 101. For example, a component (e.g., the printed circuit board 370 or the battery 189 of FIG. 1) of the electronic device 101 may be mounted on the support member 310. A display (e.g., the display 201 of FIG. 2) may be disposed on one surface of the support member 310, and the printed circuit board 370 may be disposed on the other surface of the support member 310. According to an embodiment of the disclosure, the support member 310 may be coupled to a side bezel structure (e.g., the side bezel structure 218 of FIG. 2). According to another embodiment of the disclosure (not shown), the support member 310 may form at least a part of the outer surface of the electronic device 101. For example, the support member 310 may be integrally formed with the side bezel structure 218. The support member 310 may be formed of a metallic material and/or a non-metallic material (e.g., polymer).

The rear plate 320 may form at least a part of the exterior of the electronic device 101. For example, the rear plate 320 may form the rear surface (e.g., the rear surface 210B of FIG. 2) and/or side surface (e.g., the side surface 210C of FIG. 2) of the electronic device 101. According to an embodiment of the disclosure, the support member 310 may form a part of the side surface 210C of the electronic device 101. For example, the rear plate 320 may be integrally formed with the side bezel structure (e.g., the side bezel structure 218 of FIG. 2). According to another embodiment of the disclosure (not shown), the rear plate 320 may be coupled to the side bezel structure 218. The rear plate 320 may be located opposite to the display (e.g., the display 201 of FIG. 1) with respect to the support member 310. The rear plate 320 may include at least one opening 322 for forming a path of light directed to the camera module 400.

The support member 310 and the rear plate 320 may be interpreted as forming a housing (e.g., the housing 210 of FIGS. 2 and 3).

The camera support member 330 may be disposed between the rear plate 320 and the support member 310. The camera support member 330 may protect the camera module 400 and/or the printed circuit board 370. For example, the camera support member 330 may cover at least a part of the camera module 400 and/or the printed circuit board 370.

At least a part of the camera support member 330 may be used as at least a portion of the configuration of an antenna. For example, the camera support member 330 may include an antenna module (e.g., the antenna module 197 of FIG. 1) as an optional structure. The camera support member 330 may include a near field communication (NFC) antenna, a wireless charging antenna, and/or a magnetic secure transmission (MST) antenna. The camera support member 330 may perform short-range communication with an external device or wirelessly transmit and receive power required for charging. For example, the camera support member 330 may include a coil for wireless charging.

The camera window 340 may protect the camera module 400 from an external impact. The camera window 340 may be located in correspondence with the opening 322 of the rear plate 320. At least a part of the camera window 340 may be formed to be substantially transparent, and the camera module 400 may obtain light which has passed through the camera window 340.

The compression member 350 may be located above the camera module 400 (e.g., in the Z-axis direction). The compression member 350 may be disposed between the camera window 340 and the camera module 400. The compression member 350 may be disposed between the rear plate 320 and the camera module 400. The compression member 350 may reduce movement of the camera module 400 in a first direction (+Z direction). For example, when the compression member 350 faces the camera module 400 and the camera module 400 is detached, the compression member 350 may transfer an elastic force in a second direction (−Z direction) to the camera module 400. The compression member 350 may reduce or block the introduction of a foreign material (e.g., dust) or moisture from the outside of the electronic device 101 into the electronic device 101. For example, the compression member 350 may be interpreted as a sealing member. The compression member 350 may be formed of an elastic material (e.g., sponge, spring, or foam). The compression member 350 may be interpreted as a shock absorbing member or an elastic member. The electronic device 101 may include at least one compression member 350. For example, the number of compression members 350 may be equal to or greater than the number of camera modules 400. In another example, the compression member 350 may be an integrated configuration including at least one through hole corresponding to the camera module 400.

The printed circuit board 370 may be disposed on the support member 310. The printed circuit board 370 may have a processor, a memory, and/or an interface mounted thereon. The processor may include at least one of a central processing unit, an application processor, a graphics processing unit, an image signal processor, a sensor hub processor, or a communication processor.

The memory may include, for example, a volatile memory or a non-volatile memory.

The interface may include a HDMI, a USB interface, an SD card interface, and/or an audio interface. The interface may electrically or physically couple the electronic device 101 to an external electronic device, and may include a USB connector, an SD card/multimedia card (MMC) connector, or an audio connector.

The camera module 400 may be disposed on the support member 310. The camera module 400 may be coupled to the printed circuit board 370. For example, the camera module 400 may be mounted on the support member 310, while being coupled with the printed circuit board 370. The camera module 400 may be disposed to face the first direction (e.g., +Z direction) in which the rear surface (e.g., the rear surface 200B of FIG. 2) of the electronic device 101 faces. For example, the electronic device 101 may obtain an image of a subject located in the first direction (+Z direction) by using the camera module 400. The camera module 400 may be at least partially covered by the camera window 340.

The electronic device 101 may include a battery (e.g., the battery 189 of FIG. 1). The battery may be disposed on the support member 310. The battery (not shown in FIG. 4) is a device to supply power to at least one component (e.g., the camera module 400) of the electronic device 101, and may include a non-rechargeable primary battery, a rechargeable secondary battery, or a fuel cell. At least a part of the battery may be located substantially on the same plane with the printed circuit board 370. The battery may be integrally disposed inside the electronic device 101 or detachably from the electronic device 101.

Figure 5:
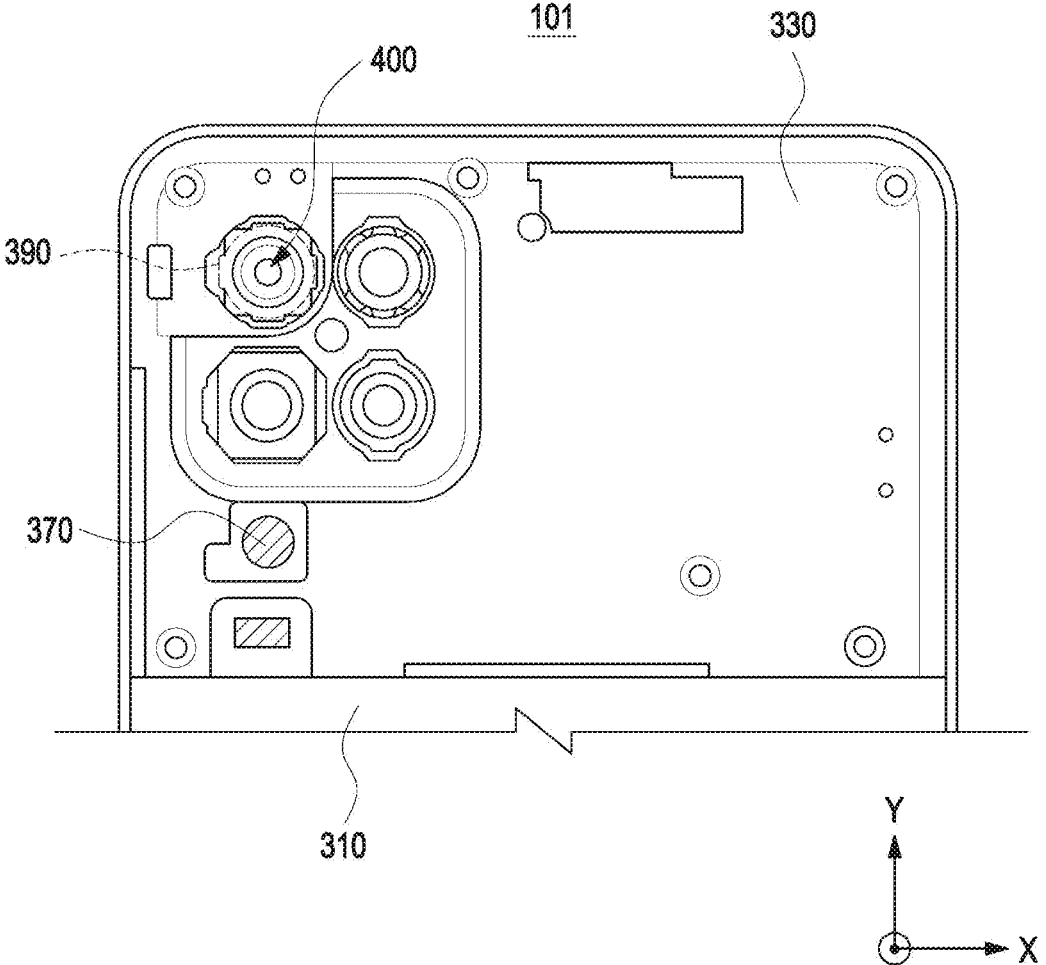
FIG. 5 is a rear view illustrating an electronic device including a lens protection film, from which a rear plate has been removed according to an embodiment of the disclosure.
Figure 6A:
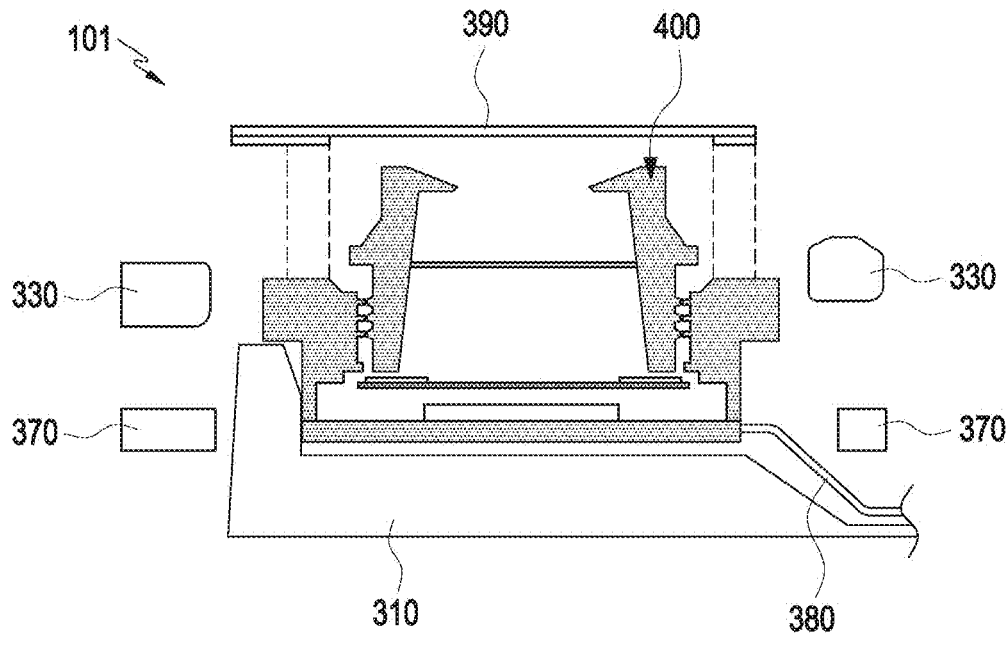
FIGS. 6A and 6B are diagrams referred to for describing detachment of a camera according to various embodiments of the disclosure.
Figure 6B:
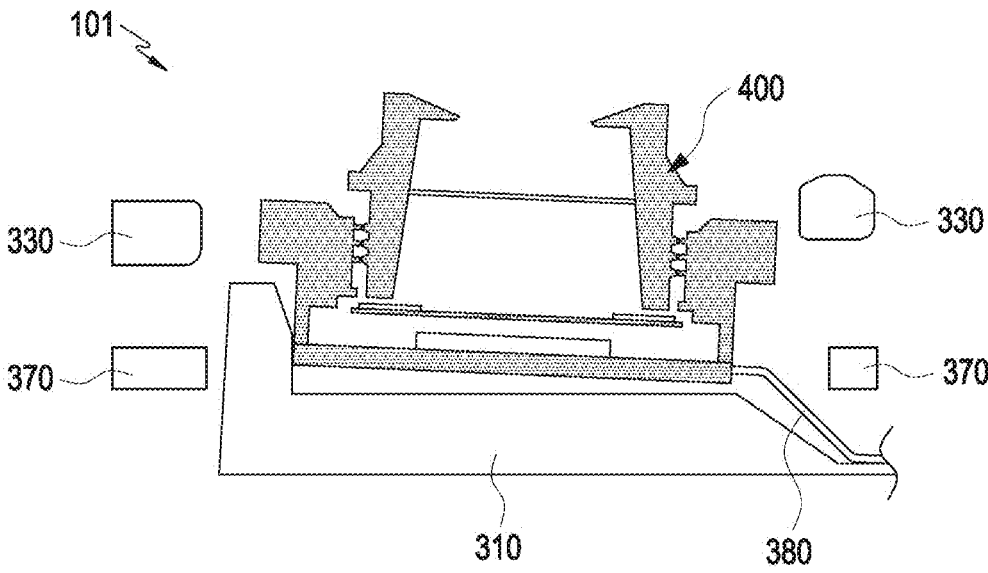

FIG. 5 is a rear view illustrating an electronic device from which a rear plate including a lens protection film has been removed according to an embodiment of the disclosure. FIGS. 6A and 6B are schematic diagrams referred to for describing detachment of a camera module according to various embodiments of the disclosure.

Referring to FIGS. 5, 6A, and 6B, the electronic device 101 may include the camera module 400 with a lens protection film 390 attached thereon, and the support member 310 with the camera module 400 disposed thereon. The configurations of the support member 310, the camera support member 330, the printed circuit board 370, and the camera module 400 illustrated in FIGS. 5, 6A, and 6B may be wholly or partially identical to those of the support member 310, the camera support member 330, the printed circuit board 370, and the camera module 400 illustrated in FIG. 4.

The lens protection film 390 may be attached to the camera module 400. The lens protection film 390 is a component for protecting the lens of the camera module 400, and may be removed from the electronic device 101 in a manufacturing process of the electronic device 101. For example, the lens protection film 390 may be a release paper or a separate paper.

The printed circuit board 370 with the camera module 400 mounted thereon may be disposed on the support member 310, and the camera support member 330 may be disposed on the printed circuit board 370 with the camera module 400 mounted thereon. The camera module 400 may be electrically coupled to the printed circuit board 370 through a flexible printed circuit board 380.

The camera support member 330 may reduce or prevent movement of the camera module 400. For example, the camera support member 330 may prevent or reduce detachment of the camera module 400 from the support member 310. The camera module 400 may be detached from the support member 310 by an external force applied in the process of removing the lens protection film 390 from the camera module 400 of the electronic device 101. The camera module 400 may be detached from the support member 310 due to a force which is applied to the camera module 400 during unfolding of the flexible printed circuit board 380 in a bent state. As the camera support member 330 prevents the camera module 400 from being detached, the vignetting phenomenon in which brightness is reduced at an edge of an image obtained from the camera module 400 may be prevented or alleviated.

According to an embodiment of the disclosure, the camera module 400 may be disposed on the support member 310 without an adhesive. The camera module 400 may be disposed at a specified position with a specified angle (e.g., in a horizontal state) by the camera support member 330, and a calibration process for adjusting the position and/or angle of the camera module 400 may be excluded. According to another embodiment of the disclosure, the electronic device 101 may include an adhesive (not shown) for increasing a bonding force between the camera module 400 and the support member 310.

Figure 7:
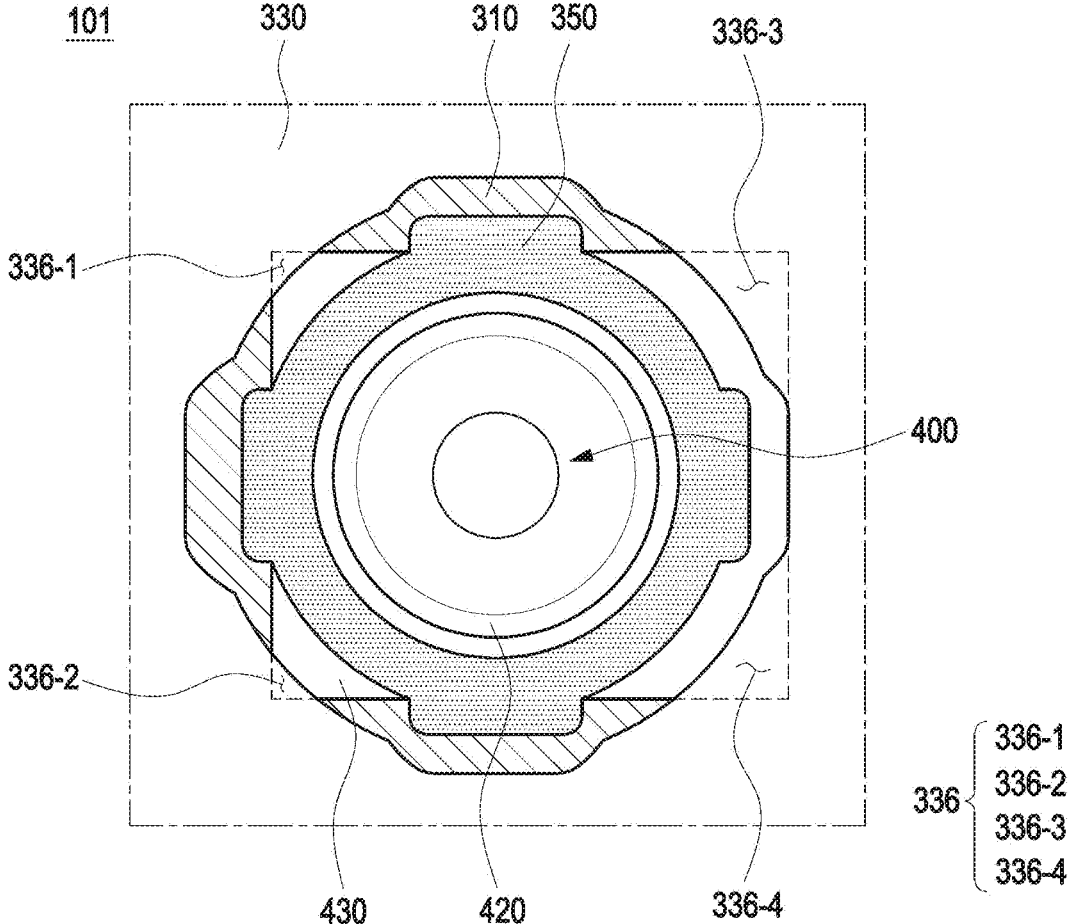
FIG. 7 is a rear view illustrating an electronic device from which a rear plate has been removed according to an embodiment of the disclosure.
Figure 8:
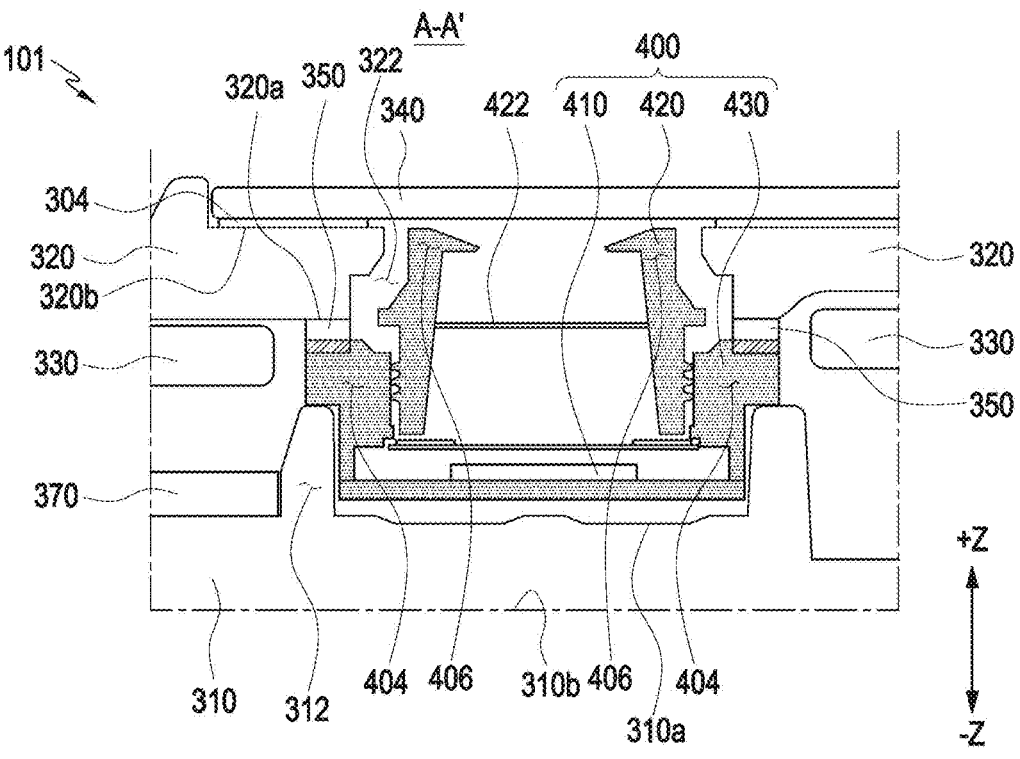
FIG. 8 is a sectional view taken along line A-A' of FIG. 3 according to an embodiment of the disclosure.
Figure 9:
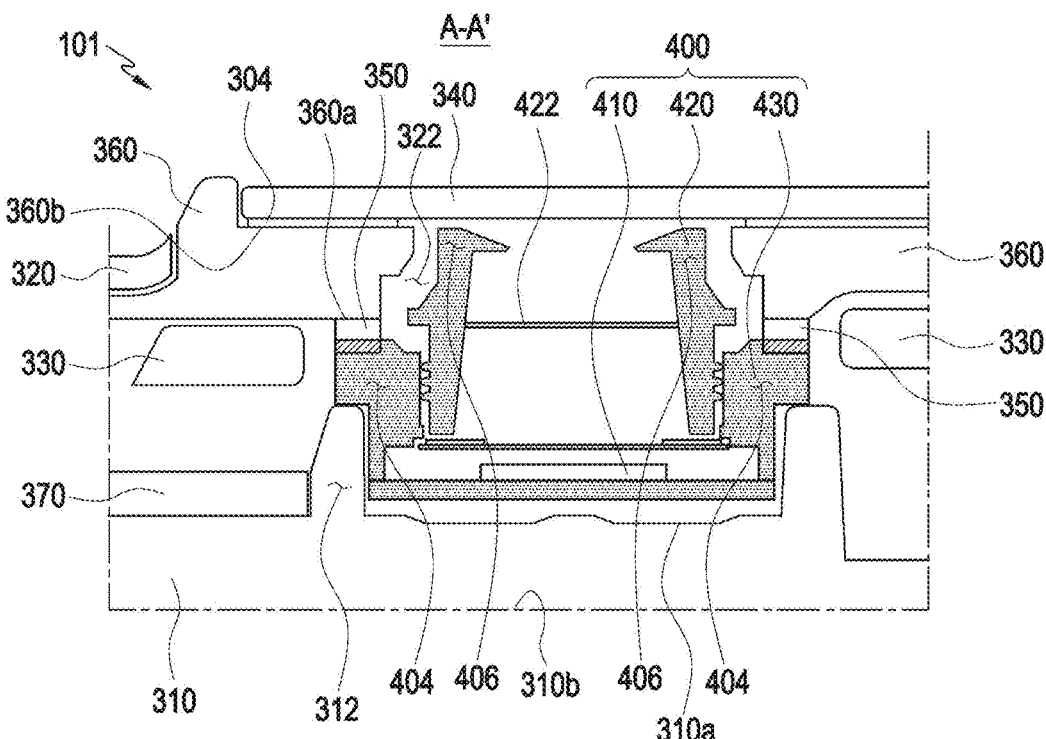
FIG. 9 is a sectional view taken along line A-A' of FIG. 3 according to an embodiment of the disclosure.
Figure 10:
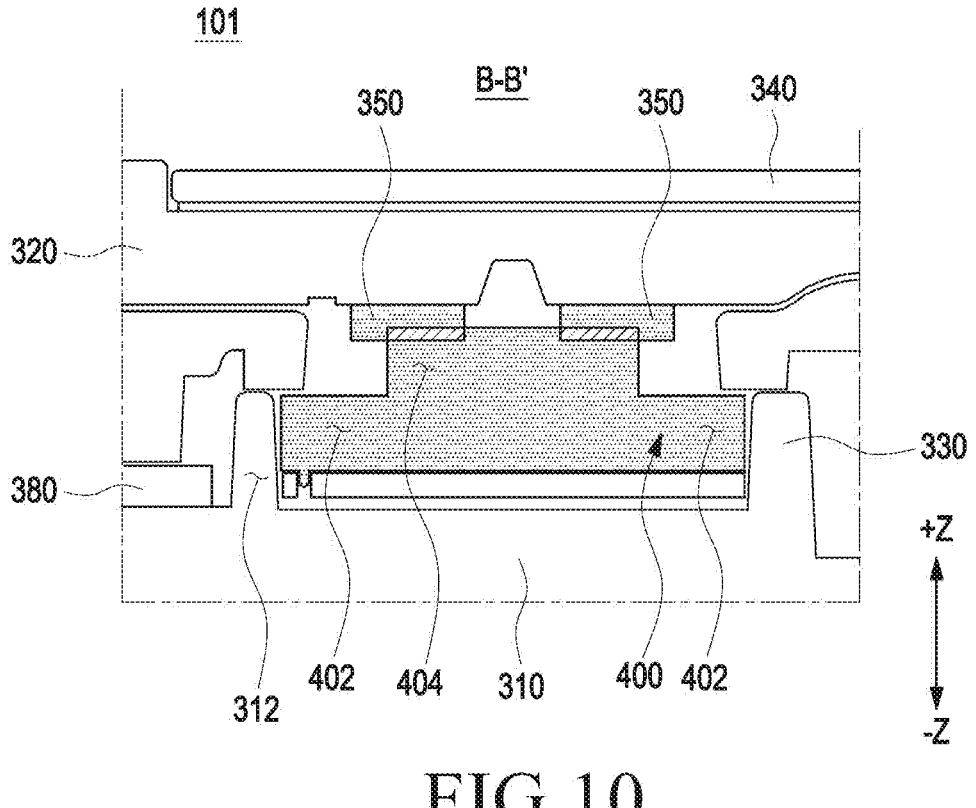
FIG. 10 is a sectional view taken along line B-B' of FIG. 3 according to an embodiment of the disclosure.
Figure 11:
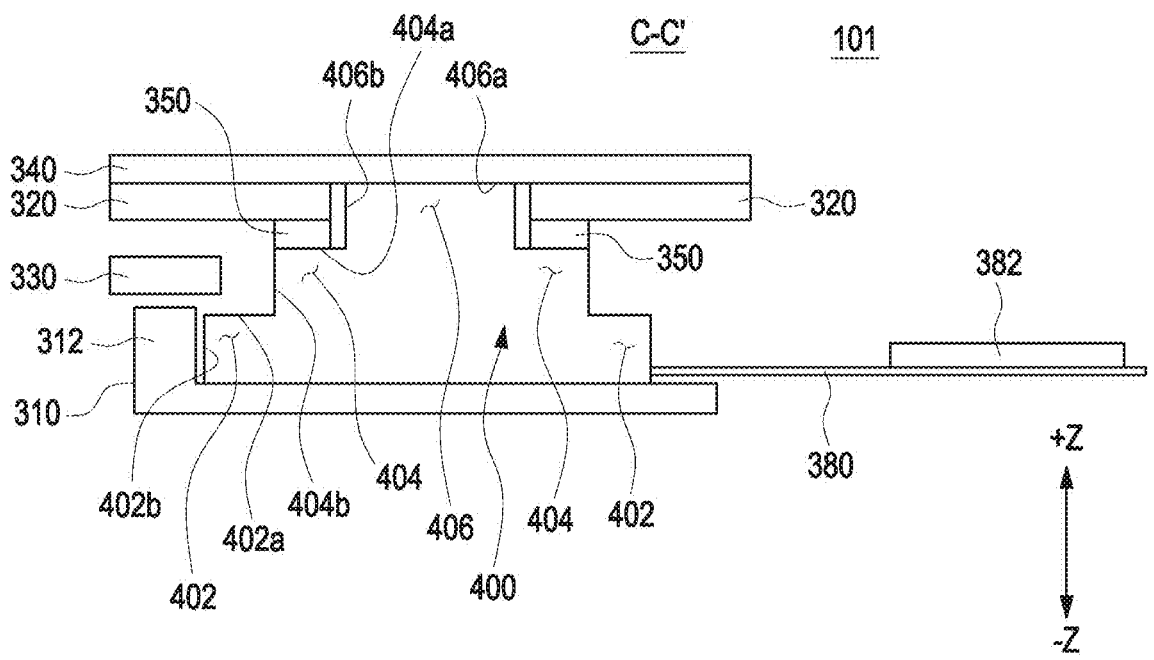
FIG. 11 is a sectional view taken along line C-C' of FIG. 3 according to an embodiment of the disclosure.

FIG. 7 is a rear view illustrating an electronic device from which a rear plate has been removed according to an embodiment of the disclosure. FIG. 8 is a sectional view taken along line A-A' of FIG. 3 according to an embodiment of the disclosure. FIG. 9 is a sectional view taken along line A-A' of FIG. 3 according to an embodiment of the disclosure. FIG. 10 is a sectional view taken along line B-B' of FIG. 3. FIG. 11 is a sectional view taken along line C-C' of FIG. 3 according to an embodiment of the disclosure.

Referring to FIGS. 7 to 11, the electronic device 101 may include the support member 310, the rear plate 320, the camera support member 330, the camera window 340, the compression member 350, and/or the camera module 400.

The configurations of the support member 310, the rear plate 320, the camera support member 330, the camera window 340, the compression member 350, and/or the camera module 400 illustrated in FIGS. 7 to 11 may be wholly or partially identical to those of the support member 310, the rear plate 320, the camera support member 330, the camera window 340, the compression member 350, and/or the camera module 400 illustrated in FIG. 4.

Referring to FIG. 7, the camera support member 330 may prevent detachment of the camera module 400. The camera support member 330 may include at least one overlap area 336 located on a first area 402 (see FIG. 10) of the camera module 400. When the camera module 400 is seen from above (e.g., the +Z direction), a part of the camera support member 330 may overlap with the camera module 400, and the overlapped area of the camera support member 330 may be interpreted as the overlap area 336. When the camera module 400 moves from a specified position, the overlap area 336 of the camera support member 330 may be brought into contact with the first area 402 of the camera module 400, thereby preventing detachment of the camera module 400 from the support member 310.

The first area 402 of the camera module 400 may overlap with the camera support member 330 at various points. For example, the camera support member 330 may include at least one of a first overlap area 336-1, a second overlap area 336-2, a third overlap area 336-3, or a fourth overlap area 336-4, which is disposed in a different direction with respect to a lens barrel 420.

The camera support member 330 may include one or more overlap areas 336. Referring to FIG. 7, the camera support member 330 is shown as including four overlap areas (the first overlap area 336-1, the second overlap area 336-2, the third overlap area 336-3, and the fourth overlap area 336-4), but embodiments of the disclosure are not limited thereto. For example, the camera support member 330 may include the first overlap area 336-1, the second overlap area 336-2, and the third overlap area 336-3, and omit the fourth overlap area 336-4.

Referring to FIG. 8 and FIG. 9, the support member 310 may accommodate the camera module 400. The support member 310 may include a first support member surface 310a facing the camera module 400, and a second support member face 310b opposite to the first support member surface 310a and facing a display (e.g., the display 201 of FIG. 2).

The support member 310 may include a sidewall 312 surrounding at least a part of the camera module 400. The sidewall 312 may extend or protrude in the first direction (e.g., +Z direction) from the first support member surface 310a toward the rear plate 320 and/or the camera window 340. The sidewall 312 may be integrally formed with the support member 310. The sidewall 312 may face the camera support member 330.

The rear plate 320 may surround a part of the camera module 400. For example, the rear plate 320 may include an opening 322 in which the lens barrel 420 of the camera module 400 is located. The rear plate 320 may support the camera window 340.

The camera window 340 may cover at least a part of the camera module 400. According to the embodiments shown in FIG. 8 or FIG. 9, the camera window 340 may be disposed on the rear plate 320. For example, the camera window 340 may be coupled on the rear surface 320b of the rear plate 320 by using an adhesive member 304. The adhesive member 304 may be an adhesive tape or an adhesive. According to an embodiment (not shown), the camera window 340 may be integrally formed with the rear plate 320. For example, the rear plate 320 may include a substantially transparent area covering at least a part of the camera module 400. As shown in FIG. 9, the camera window 340 may be disposed on a camera decoration member 360. For example, the camera window 340 may be coupled on a rear surface 360b of the camera decoration member 360 by using the adhesive member 304.

The compression member 350 may face a part (e.g., a second area 404 of FIG. 11) of the camera module 400. According to the embodiment illustrated in FIG. 8, the compression member 350 may be disposed under the rear plate 320. For example, the compression member 350 may be disposed between a front surface 320a of the rear plate 320 and a third surface 404a of the second area 404. According to the embodiment illustrated in FIG. 9, the compression member 350 may be disposed under the camera decoration member 360. For example, the compression member 350 may be disposed between a front surface 360a of the camera decoration member 360 and the third surface 404a of the second area 404. According to another embodiment of the disclosure (not shown), the compression member 350 may be disposed under the camera window 340. The compression member 350 may surround at least a part of the camera module 400. For example, the compression member 350 may be formed into a closed loop.

Referring to FIG. 9, the electronic device 101 may include the camera decoration member 360. The camera decoration member 360 may protect the camera module 400 against an external impact. At least a part of the camera decoration member 360 may be disposed between the camera window 340 and the camera support member 330 and surround at least a part of the camera module 400. The compression member 350 may be disposed on the front surface 360a of the camera decoration member 360. The camera decoration member 360 may be formed integrally with the rear plate 320. For example, the rear plate 320 may surround at least a part of the camera window 340. At least a part of the camera decoration member 360 may be visually exposed to the outside of the electronic device 101 and enhance the aesthetics of the electronic device 101.

The camera module 400 may include an image sensor 410 for converting light obtained from the camera module 400 into a digital signal, the lens barrel 420 accommodating at least one lens 422, and a camera housing 430 accommodating the image sensor 410.

The camera module 400 may be disposed inside a housing (e.g., the housing 210 of FIG. 2). For example, the camera module 400 may be disposed between the support member 310 and the camera window 340.

The camera module 400 may be formed in a structure for reducing or preventing detachment of the camera module 400 from the support member 310 by the camera support member 330 and/or the compression member 350. For example, the camera module 400 may be formed in a stepped structure. The camera module 400 may include the first area 402 facing the camera support member 330, the second area 404 facing the compression member 350, and a third area 406 facing the camera window 340. The first area 402, the second area 404, and the third area 406 may be arranged along the first direction (+Z direction) from the support member 310 toward the camera window 340.

The first area 402 may be an area of the camera module 400 adjacent to the support member 310. For example, the first area 402 may be a part of the camera housing 430. The first area 402 may include a first surface 402a facing the camera support member 330 and a second surface 402*b* facing the sidewall 312 of the support member 310.

The second area 404 of the camera module 400 may contact the compression member 350. The second area 404 may include the third surface 404*a* facing the compression member 350 and a fourth surface 404*b* facing the camera support member 330. When the camera module 400 receives an external force in a process of removing the lens protection film (e.g., the lens protection film 390 of FIG. 6A) and/or receives a reaction force from a flexible printed circuit board (e.g., the flexible printed circuit board 380 of FIG. 6A), the compression member 350 may come into contact with the third surface 404*a* of the second area 404 and prevent detachment of the camera module 400.

The second area 404 may extend or protrude from the first area 402 toward the rear plate 320 and/or the camera window 340. For example, the second area 404 may be positioned above the first area 402 (e.g., in the +Z direction). The second area 404 may be a part of the camera housing 430. The camera module 400 may be at least partially surrounded by the camera support member 330.

The third area 406 may face the camera window 340. For example, the third area 406 may be a part of the lens barrel 420 adjacent to the camera window 340.

The third area 406 may extend or protrude from the second area 404 toward the rear plate 320 and/or the camera window 340. For example, the third area 406 may be positioned above the second area 404 (e.g., in the +Z direction).

At least a part of the camera module 400 may be disposed between the sidewall 312 of the support member 310 and the flexible printed circuit board 380. The camera module 400 may be coupled to the printed circuit board 370 by using the flexible printed circuit board 380 and a connecting terminal 382. The camera module 400 may receive a force in the horizontal direction (e.g., an XY plane direction) perpendicular to the vertical direction (e.g., the Z-axis direction) from the flexible printed circuit board 380. The sidewall 312 may reduce or prevent detachment of the camera module 400 from a predetermined position.

Figure 12:
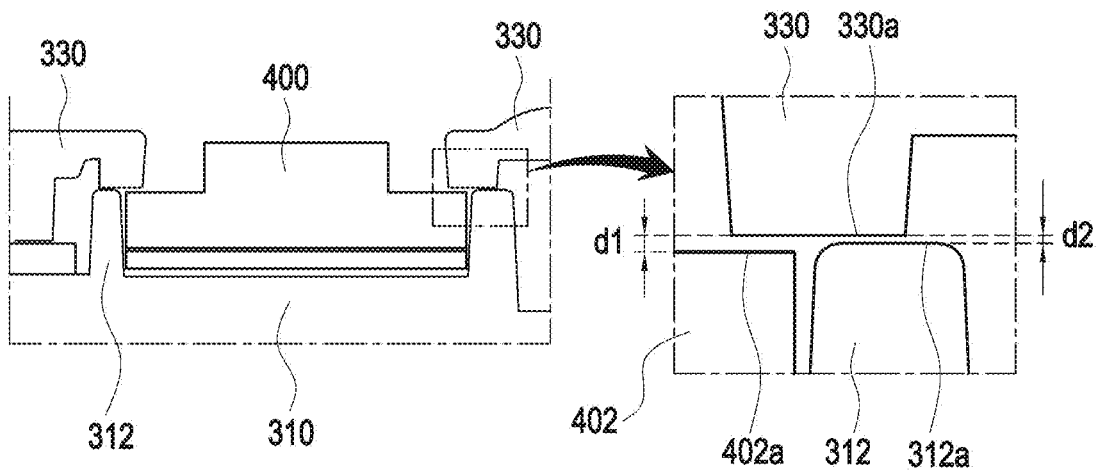
FIG. 12 is a sectional view illustrating an electronic device according to an embodiment of the disclosure.

FIG. 12 is a sectional view illustrating an electronic device according to an embodiment of the disclosure.

Referring to FIG. 12, the camera support member 330 may be disposed apart from the camera module 400 and the support member 310. For example, a front surface 330*a* of the camera support member 330 may be spaced from a seventh surface 312*a* formed on the sidewall 312 of the support member 310 and the first surface 402*a* of the first area 402 of the camera module 400. The configurations of the support member 310, the camera support member 330, and the camera module 400 of FIG. 12 may be wholly or partially identical to those of the support member 310, the camera support member 330, and the camera module 400 of FIGS. 7 to 11.

The support member 310 may reduce an impact on the camera module 400. For example, the support member 310 may contact or collide with the camera support member 330, thereby reducing an impact applied to the camera module 400.

The sidewall 312 of the support member 310 may be disposed closer to the camera support member 330 than the first area 402 of the camera module 400. For example, a first distance d1 between the first area 402 of the camera module 400 and the camera support member 330 may be larger than a second distance d2 between the sidewall 312 of the support member 310 and the camera support member 330. When the first distance d1 is larger than the second distance d2, the camera module 400 may contact or collide with the camera support member 330 after the support member 310 contacts or collides with the camera support member 330, and an impact applied to the camera module 400 may be reduced.

The front surface 312*a* of the sidewall of the support member 310 and the first surface 402*a* of the first area 402 of the camera module 400 may be located substantially on the same plane. For example, the first distance d1 between the first area 402 of the camera module 400 and the camera support member 330 may be substantially equal to the second distance d2 between the sidewall 312 of the support member 310 and the camera support member 330. Since the support member 310 and the camera module 400 contact or collide with the camera support member 330 substantially at the same time, an impact applied to the camera module 400 may be reduced.

Figure 13:
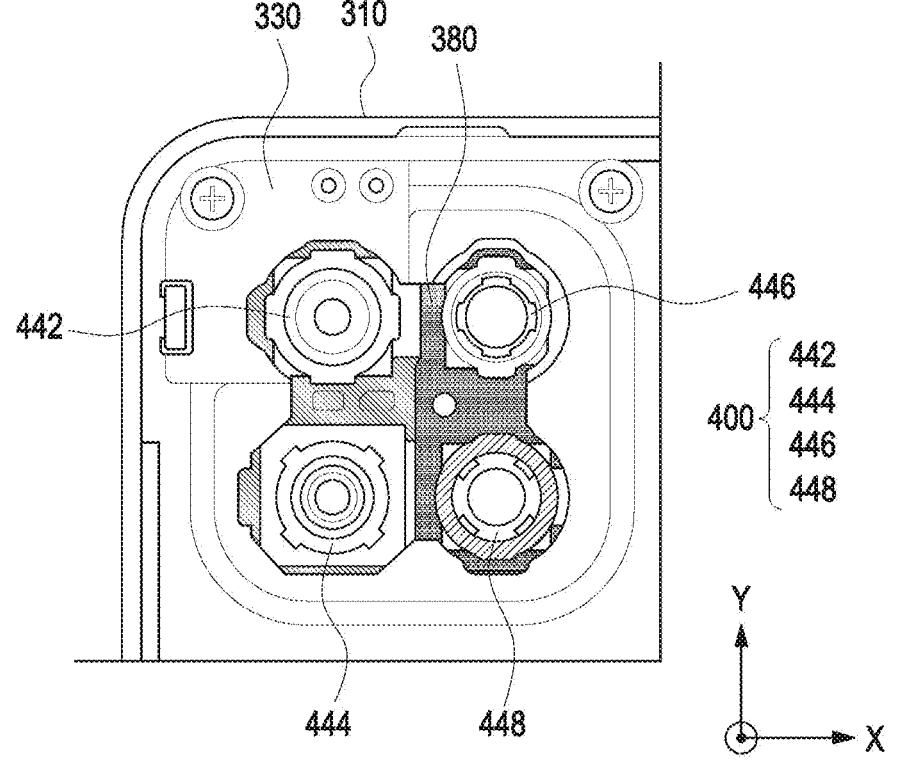
FIG. 13 is a rear view illustrating an electronic device from which a rear plate has been removed according to an embodiment of the disclosure.

FIG. 13 is a rear view illustrating an electronic device from which a rear plate has been removed according to an embodiment of the disclosure.

Referring to FIG. 13, the camera module 400 of the electronic device 101 may include at least one camera module. For example, the camera module 400 may include a plurality of camera modules 442, 444, 446, and 448. The camera module 440 may include a first camera module 442 (e.g., the camera module 400 of FIGS. 7 to 11), and at least one camera module 444, 446, and 448 spaced apart from the first camera module 442. For example, the camera module 400 may include the first camera module 442, a second camera module 444, a third camera module 446, and/or a fourth camera module 448. The configurations of the support member 310, the camera support member 330, the printed circuit board 380, and the camera module 400 of FIG. 13 may be wholly or partially identical to those of the support member 310, the camera support member 330, the printed circuit board 380, and the camera module 400 of FIGS. 7 to 11.

The plurality of camera modules 442, 444, 446, and 448 may capture an image and/or a video in the same direction (e.g., the first direction (+Z direction)). For example, the first camera module 442, the second camera module 444, the third camera module 446, and/or the fourth camera module 448 may be disposed on the support member 310.

The camera support member 330 may be disposed to face or overlap with at least one of the plurality of camera modules 442, 444, 446, and 448. For example, the camera support member 330 may face the first camera module 442 and the second camera module 444, thereby preventing the first camera module 442 and the second camera module 444 from being detached from the support member 310. The first camera module 442 may be a camera including an ultra wide lens. The second camera module 444 may be a camera including a telephoto lens.

Figure 14:
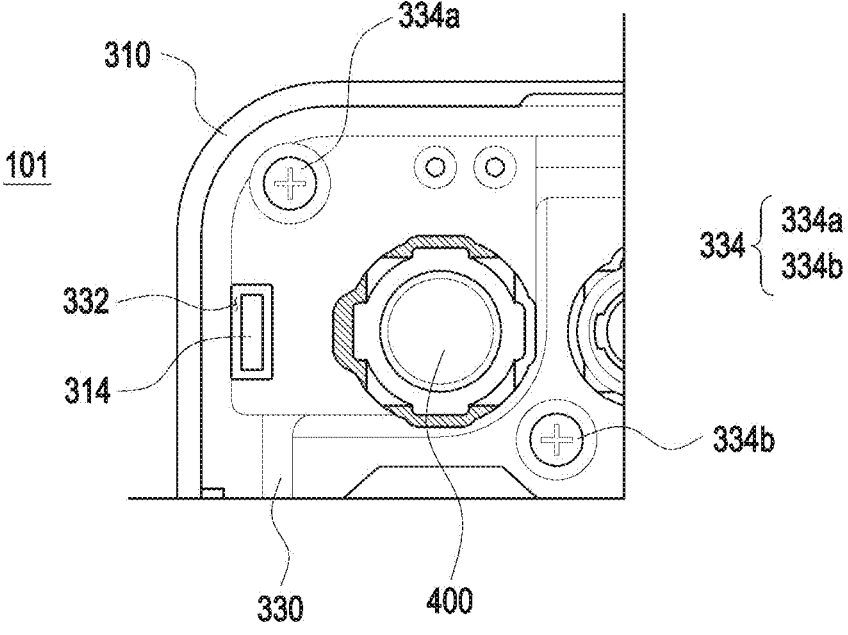
FIG. 14 is a rear view illustrating an electronic device including a boss structure and/or a hook structure according to an embodiment of the disclosure.

FIG. 14 is a rear view illustrating an electronic device including a boss structure and/or a hook structure according to an embodiment of the disclosure.

Referring to FIG. 14, the support member 310 and the camera support member 330 may be coupled with each other by using a hook structure 314 and/or a boss structure 334. The configurations of the support member 310, the camera support member 330, and the camera module 400 of FIG. 14 may be wholly or partially identical to those of the support member 310, the camera support member 330, and the camera module 400 of FIGS. 7 to 11.

The support member 310 and the camera support member 330 may be coupled to or combined with each other by using the hook structure 314. The support member 310 may include at least one first hook structure 314, and the camera support member 330 may include at least one first recess 332 for receiving the at least one first hook structure 314 therein. Although not shown, the camera support member 330 may include at least one second hook structure, and the support member 310 may include at least one second recess (not shown) for accommodating the at least one second hook structure therein.

The support member 310 and the camera support member 330 may be coupled with each other by using at least one boss structure 334*a* and 334*b*. The boss structures 334*a* and 334*b* may be fastening members (e.g., screw structures or pin structures). According to an embodiment, the electronic device 101 may include at least one of a first boss structure 334*a* located at an edge of the electronic device 101 or a second boss structure 334*b* located among the first camera module 442, the second camera module 444, the third camera module 446, and the fourth camera module 448 of the camera module 400.

According to various embodiments of the disclosure, an electronic device (e.g., the electronic device 101 of FIG. 2) may include a housing (e.g., the housing 310 of FIG. 4) including a support member (e.g., the support member 310 of FIG. 4) and a rear plate (e.g., the rear plate 320 of FIG. 4), a camera support member (e.g., the camera support member 330 of FIG. 4) disposed between the support member and the rear plate, a camera module (e.g., the camera module 400 of FIG. 4) disposed on the support member, a camera window (e.g., the camera window 340 of FIG. 4) covering at least a part of the camera module, and a compression member (e.g., the compression member 350 of FIG. 4) disposed between the camera window and the camera module.

The camera module may include a first area (e.g., the first area 402 of FIG. 11) facing the camera support member, a second area (e.g., the second area 404 of FIG. 11) facing the compression member, and a third area (e.g., the third area 406 of FIG. 11) facing the camera window and at least partially surrounded by the compression member.

According to various embodiments, the rear plate may surround at least a part of the camera window, and the compression member may be disposed between the rear plate and the second area.

According to various embodiments, the electronic device may further include a camera decoration member (e.g., the camera decoration member 360 of FIG. 9) at least partially disposed between the camera window and the camera support member, and the compression member may be disposed between the camera decoration member and the second area.

According to various embodiments, the first area, the second area, and the third area may be arranged along a first direction (e.g., the first direction (+Z direction) of FIG. 11) from the support member toward the camera window.

According to various embodiments, the support member may include a sidewall (e.g., the sidewall 312 of FIG. 11) surrounding at least a part of the camera module, and the sidewall may face the camera support member.

According to various embodiments, a first distance (e.g., the first distance d1 of FIG. 12) between the first area of the camera module and the camera support member may be equal to or larger than a second distance (e.g., the second distance d2 of FIG. 12) between the sidewall and the camera support member.

According to various embodiments, the electronic device may further include a flexible printed circuit board (e.g., the flexible printed circuit board 380 of FIG. 11) coupled to the camera module, and a printed circuit board (e.g., the printed circuit board 370 of FIG. 8) disposed on the support member and electrically coupled to the camera module through the flexible printed circuit board.

According to various embodiments, at least a part of the camera module may be disposed between the sidewall and the flexible printed circuit board.

According to various embodiments, the first area may include a first surface (e.g., the first surface 402*a* of FIG. 11) facing the camera support member and a second surface (e.g., the second surface 402*b* of FIG. 11) extending from the first surface and facing the support member, the second area may include a fourth surface (e.g., the fourth surface 404*b* of FIG. 11) extending from the first surface and facing the camera support member, and a third surface (e.g., the third surface 404*a* of FIG. 11) extending from the fourth surface and facing the compression member, and the third area may include a sixth surface (e.g., the sixth surface 406*b* of FIG. 11) extending from the third surface and facing the rear plate and a fifth surface (e.g., the fifth surface 406*a* of FIG. 11) extending from the sixth surface and facing the camera window.

According to various embodiments, the support member may include at least one hook structure (e.g., the hook structure 314 of FIG. 14), to be coupled to the camera support member, and the camera support member may include at least one recess (e.g., the recess 332 of FIG. 14) for accommodating the at least one hook structure therein.

According to various embodiments, the camera support member and the support member may be coupled with by at least one boss structure (e.g., the boss structure 334 of FIG. 14).

According to various embodiments, the camera support member may accommodate an antenna module therein.

According to various embodiments, the camera module may include an image sensor (e.g., the image sensor 410 of FIG. 8), a lens barrel (e.g., the lens barrel 420 of FIG. 8) accommodating at least one lens (e.g., the lens 422 of FIG. 8 and forming the third area, and a camera housing (e.g., the camera housing 430 of FIG. 8) accommodating the image sensor and forming the first area and the second area.

According to various embodiments, the camera support member may include a plurality of overlap areas (e.g., the overlap area 336 of FIG. 7) disposed on the camera housing, and the plurality of overlap areas may be located in different directions with respect to the lens barrel.

According to various embodiments, the camera module may include a first camera module (e.g., the first camera module 442 of FIG. 13) and a second camera module (e.g., the second camera module 444 of FIG. 13) spaced apart from the first camera module, and the camera support member may face at least a part of the first camera module and the second camera module.

According to various embodiments of the disclosure, an electronic device (e.g., the electronic device 101 of FIG. 2) may include a housing (e.g., the housing 210 of FIG. 2) including a support member (e.g., the support member 310 of FIG. 4) and a rear plate (e.g., the rear plate 320 of FIG. 4), a camera module (e.g., the camera module 400 of FIG. 4) disposed on the support member, a camera support member (e.g., the camera support member 330 of FIG. 4) disposed between the support member and the rear plate, a camera window (e.g., the camera window 340 of FIG. 4) covering at least a part of the camera module, and a compression member (e.g., the compression member 350 of FIG. 4) disposed between the camera window and the camera module, and the camera module may include a camera housing (e.g., the camera housing 430 of FIG. 8)

accommodating an image sensor (e.g., the image sensor 410 of FIG. 8) and including a first area (e.g., the first area 402 of FIG. 10) facing the camera support member, and a second area (e.g., the second area 404 of FIG. 10) protruding from the first area toward the camera window and facing the compression member, and a lens barrel accommodating at least one lens (e.g., the lens 422 of FIG. 10) and including a third area (e.g., the third area 406 of FIG. 10) facing the camera window.

According to various embodiments, the rear plate may surround at least a part of the camera window, and the compression member may be disposed between the rear plate and the second area.

According to various embodiments, the electronic device may further include a camera decoration member (e.g., the camera decoration member 360 of FIG. 9) at least partially disposed between the camera window and the camera support member, and the compression member may be disposed between the camera decoration member and the second area.

According to various embodiments, the support member may include a sidewall (e.g., the sidewall 312 of FIG. 8) surrounding at least a part of the camera module, and the sidewall may face the camera support member.

According to various embodiments, the electronic device may further include a flexible printed circuit board (e.g., the flexible printed circuit board 380 of FIG. 11) coupled to the camera module, and a printed circuit board (e.g., the printed circuit board 370 of FIG. 8) disposed on the support member and electrically coupled to the camera module through the flexible printed circuit board, and at least a part of the camera module may be disposed between the sidewall and the flexible printed circuit board.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing including a rear plate and a camera window coupled to the rear plate, the rear plate and the camera window together forming a rear surface of the electronic device;
a camera module accommodated in the housing and including a camera lens barrel and a camera housing substantially surrounding the camera lens barrel;
a camera support member including an opening, wherein the camera module is disposed substantially under the camera window such that a portion of a periphery of the opening of the camera support member is in contact with a first portion of an upper surface of the camera housing; and
a compression member disposed between the camera window and the camera housing such that the compression member is located in the opening so as to substantially surround the camera lens barrel and contact a second portion of the upper surface of the camera housing different from the first portion.

2. The electronic device of claim 1, wherein the rear plate includes another opening formed therein, and the camera window is coupled to the rear plate so as to substantially cover the other opening.

3. The electronic device of claim 1, wherein the compression member has a shape of a closed loop.

4. The electronic device of claim 1, further comprising:
an antenna module at least partially disposed in the camera support member.

5. The electronic device of claim 1,
wherein the housing includes a support member, and
wherein the camera module is disposed over the support member.

6. The electronic device of claim 1, further comprising:
a printed circuit board (PCB) accommodated in the housing,
wherein the camera module is disposed on the PCB.

7. The electronic device of claim 1, wherein the compression member is composed of an elastic material.

8. The electronic device of claim 1, wherein at least one area of the camera support member overlaps the camera module.

9. The electronic device of claim 1, wherein the camera module includes a plurality of camera modules, each camera module including a camera lens barrel and a camera housing.

10. The electronic device of claim 9, wherein the camera support member includes a plurality of openings, each opening corresponding to one of the plurality of camera modules.

11. The electronic device of claim 1, further comprising:
a camera decoration member at least partially disposed between the camera window and the camera support member,
wherein at least a portion of the compression member is disposed the camera decoration member and the camera module.

12. The electronic device of claim 11, wherein the camera decoration member is integrally formed with the rear plate.

13. The electronic device of claim 1, wherein the housing further includes a side wall disposed inside the electronic device and surrounding at least a part of the camera module and facing the camera support member.

14. The electronic device of claim 1, further comprising an antenna module accommodated in the camera support member.

15. The electronic device of claim 1, further comprising another camera module spaced apart from the camera module,
wherein the camera support member faces at least a part of the camera module and at least a part of another camera module.

16. An electronic device comprising:
a housing including a plate and a camera window coupled to the plate, the plate and the camera window together forming one surface of the electronic device;
a camera module disposed in an inner space of the housing and including a camera lens barrel and a camera housing substantially surrounding the camera lens barrel, wherein the camera housing includes a first surface facing in the camera window;
a camera support member including a first opening, wherein the camera module is aligned with the camera window such that a portion of a periphery of the first opening of the camera support member is in contact with a first portion of the first surface of the camera housing; and
a compression member disposed between the camera window and the camera housing such that the compression member is located in the first opening so as to substantially surround the camera lens barrel and contact a second portion of the first surface of the camera housing different from the first portion.

17. The electronic device of claim 16, wherein the plate includes a second opening covered by at least a portion of the camera window, and wherein another portion of camera window is stacked on a portion of a periphery of the second opening of the plate.

18. The electronic device of claim 16, wherein the housing further includes a side wall disposed inside the electronic device, surrounding at least a part of the camera module and facing the camera support member and spaced apart from the camera support member.

19. The electronic device of claim 18, further comprising a flexible printed circuit board electrically connected to the camera module, wherein at least a portion of the camera module is disposed between the side wall and the flexible printed circuit board.

20. The electronic device of claim 16, wherein a first distance between the camera window and the first portion is larger than a second distance between the camera window and the second portion.

* * * * *